United States Patent [19]

Lowther

[11] 4,002,921
[45] Jan. 11, 1977

[54] HIGH FREQUENCY POWER SUPPLY

[75] Inventor: Frank Eugene Lowther, Severna Park, Md.

[73] Assignee: Union Carbide Corporation, New York, N.Y.

[22] Filed: Dec. 19, 1974

[21] Appl. No.: 534,190

Related U.S. Application Data

[63] Continuation-in-part of Ser. Nos. 456,396, March 29, 1974, abandoned, and Ser. No. 509,016, Sept. 25, 1974, abandoned.

[52] U.S. Cl. .................................. 307/43; 204/176; 250/536; 307/82; 321/45 R
[51] Int. Cl.² ..................... H02J 1/10; H02M 7/515
[58] Field of Search ............... 317/2 HF, 4, 262 A; 307/132 R, 252 L, 305, 43, 81, 82; 128/190; 204/176; 250/535, 536; 321/4, 45 R; 331/117 R

[56] References Cited

UNITED STATES PATENTS

| | | | |
|---|---|---|---|
| 3,243,729 | 3/1966 | Olson et al. | 331/117 |
| 3,335,353 | 8/1967 | McVey et al. | 321/5 |
| 3,351,779 | 11/1967 | Hehenkamp | 321/45 R |
| 3,368,164 | 2/1968 | Shapiro | 331/117 |
| 3,496,092 | 2/1970 | Fraser | 321/45 R |
| 3,699,426 | 10/1962 | Bauman | 321/27 R |

FOREIGN PATENTS OR APPLICATIONS

| | | | |
|---|---|---|---|
| 15,079 | 4/1971 | Japan | 307/43 |
| 422,977 | 4/1967 | Switzerland | 321/45 R |

Primary Examiner—William H. Beha, Jr.
Attorney, Agent, or Firm—John C. LeFever

[57] ABSTRACT

A solid state power supply circuit for a corona generator type device wherein two alternately fired load commutated SCR (Silicon Controlled Rectifier) means conduct in opposite directions through the primary winding of a power transformer. Each SCR means is series connected to a separate DC power source and isolated from the other SCR means by means of diodes. A corona generator is connected to the secondary of the power transformer and receives symmetrical, bipolar power pulses from the power supply circuit.

5 Claims, 8 Drawing Figures

HIGH FREQUENCY POWER SUPPLY

This application is a continuation-in-part of my U.S. application Ser. No. 456,396, filed Mar. 29, 1974, now abandoned, and Ser. No. 509,016, filed Sept. 25, 1974, now abandoned.

The present invention relates to high frequency power supply apparatus, and more specifically to solid state frequency converters which are particularly suitable for supplying high voltage symmetrical power to corona generators.

It has been shown that the output of a given corona generator may be increased by increasing the applied power through application of higher frequency. Previous methods for increasing the frequency of standard 60 Hz line voltage have included the use of motor generators and a variety of electronic frequency multipliers. In my U.S. Pat. No. 3,784,838, issued Jan. 8, 1974, I have disclosed a load commutated solid state frequency converter circuit which is capable of producing high frequency unipolar electrical pulses at high voltages. This device is reliable, efficient, and much cheaper to produce than motor generator or conventional commutated solid state electronic high frequency power supplies. It has been found, however, that when corona generators are operated under maximum output conditions, the use of unipolar power apparently tends to cause separation and migration of electrons and positively charged molecules to the respective positive and negative electrodes of the generator. This separation and migration causes non-uniform corona discharge and limits the efficiency of the device. Furthermore, the operational noise level of unipolar devices tends to be high due to unbalanced vibrations which are induced in the high frequency power transformer.

It is therefore an object of the present invention to provide an improved high frequency power supply for corona discharge type apparatus.

It is a further object to provide a solid state load commmutated power supply circuit which is capable of producing high frequency symmetrical (bi-polar) power to a corona generator type load.

It is yet another object to provide an ozone generator which includes a low cost and efficient source of symmetrical high frequency power and which is capable of operation at an extremely low noise level.

These objects will become readily apparent to one skilled in the art from the following detailed description and drawing wherein.

Broadly, my invention contemplates a load commutated silicon controlled rectifier (SCR) high frequency converter circuit which is capable of supplying symmetrical power to a corona discharge type load.

More specifically, I have discovered a symmetrical high frequency power supply circuit in which two alternately fired, load commutated SCR means conduct in opposite directions to the primary winding of a power transformer. Each SCR means is a series connected to a separate DC power source, and furthermore, in series with diode means which isolates the output of one SCR means from the other. A corona generator type device is connected to the secondary winding of the power transformer and receives symmetrical, bipolar power pulses from the power supply circuit.

Figure 1:
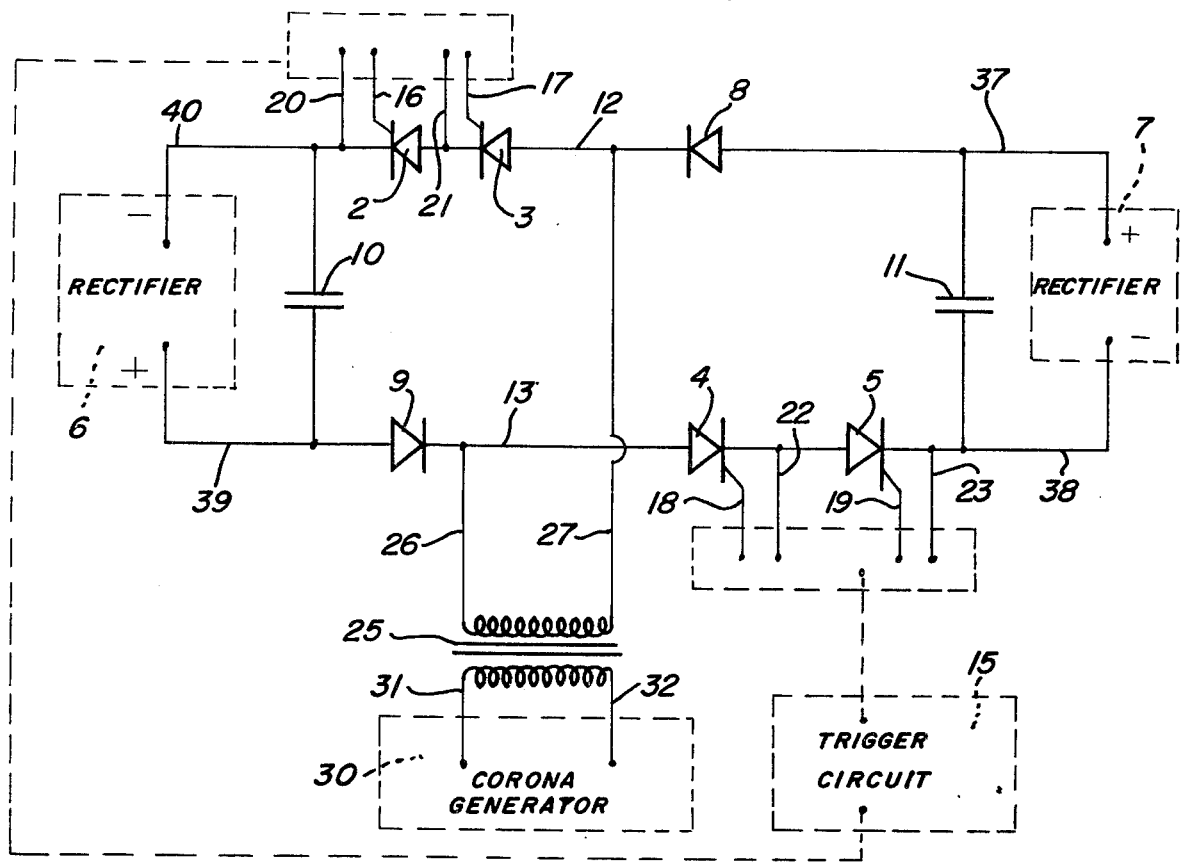
FIG. 1 is a circuit diagram of a frequency converter of the present invention.

A more clear understanding of my invention may be obtained by referring to FIG. 1 which comprises a circuit diagram of a typical power supply device of the present invention. In FIG. 1, two SCR devices 2 and 3, are series connected to constitute one SCR switching means which, according to conventional conducts in a counter-clockwise direction in the circuit as shown. SCR means 4 and 5 constitute a second SCR switching means and also conduct in a counter-clockwise direction as shown. SCR's 2 and 3 are also in series with a DC rectifier power supply 6. Likewise, series connected SCR's 4 and 5 are in series with a separate DC power supply 7. Both DC power supplies 6 and 7 are indicated as being within a broken line, and the details of the construction of the DC power supply means 6 and 7 are set forth in FIG. 3.

Also in series with the SCR's 4 and 5 and the power supply 7 is a diode 8. The circuit which comprises series connected SCR's 2 and 3 and rectifier means 6 also includes a diode 9 in series. A capacitor 10 is connected across the output of the DC power supply 6. Furthermore, capacitance 11 is connected across the output of the DC power supply 7. The function of these capacitors 10 and 11 is to prevent undue fluctuations in the output of the DC power supplies. It is noted that the diode 8 is connected to the SCR means 3 by means of a conductor 12. In a similar manner, the diode 9 is connected to the SCR 4 by means of conductor 13.

The SCR's 2, 3, 4 and 5 are controlled by being fired or triggered by means of a conventional trigger circuit which is depicted in FIG. 1 as being enclosed within the confines of broken line 15. The details of trigger circuit 15 are set forth in FIG. 2. As shown in FIG. 1, the trigger circuit 15 supplies trigger pulses to gate leads 16, 17, 18 and 19 of SCR's 2, 3, 4 and 5 respectively. The trigger pulse circuits to the SCR's 2, 3, 4 and 5 is completely by means of conductors 20, 21, 22 and 23.

A power transformer 25 includes a primary winding which is connected to the SCR circuits by means of leads 26 and 27. As shown in FIG. 1, gate 26 is connected to the conductor 13 which connects diode 9 with SCR 4, and lead 27 is connected to the circuit at junction with the conductor 12 which connects SCR 3 with diode 8. The secondary of the power transformer 25 is connected to a corona generator type load 30 by means of conductors 31 and 32. As shown in FIG. 1, the corona generator is depicted as being confined within a broken line. The construction details of typical corona generators which may be utilized in constructing the apparatus of the present invention is set forth in FIGs. 4, 5 and 6.

As indicated above, the circuit shown in FIG. 1 is supplied with DC power by two separate DC power sources 6 and 7. The DC power source 7 is connected in series with the SCR's 4 and 5 by diode 8 as well as the primary of power generator 25 by means of connecting leads 37 and 38. In a similar manner, the DC power source 6 is interconnected in series wise fashion with SCR's 2 and 3 and diode 9 as well as the primary of transformer 25 by means of leads 39 and 40.

Figure 2:
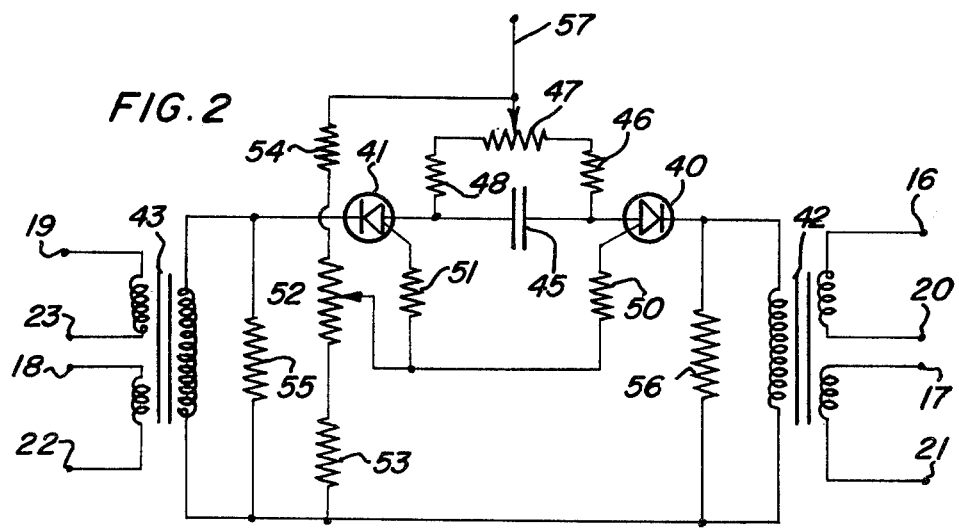
FIG. 2 is a diagram of a conventional flip-flop trigger circuit which may be used in the converter circuit of FIG. 1.

Reference to FIG. 2 reveals a typical programmable unijunction transistor (PUT) flip-flop trigger circuit which may be used to trigger the SCR's shown in FIG. 1. In FIG. 1 a circuit such as shown in FIG. 2 is enclosed within the broken line 15.

In FIG. 2 the flip-flop circuit comprises two unijunction transistors, 40 and 41, which are connected in series with the primary side of pulse isolation transformers 42 and 43 respectively. The circuit of FIG. 2 also includes a capacitor 45 connected in series between the transistors 40 and 41. The capacitor 45 is bridged by means of parallel connected resistances 46, 47 and 48. The resistances 46 and 48 are fixed, while the resistance 47 is a variable resistance which is used to trim the symmetry of the trigger pulse output of the flip-flop circuit.

Also included in FIG. 2 are fixed resistances 50 and 51 which are connected to the gates of transistors 40 and 41 respectively. A variable resistance 52 connects the gates of the transistors 40 and 41 to the circuit, which also includes fixed resistors 53 and 54 connected in series therewith. A pair of fixed resistances, 55 and 56, are connected between the outputs of the transistors 41 and 40 respectively, and also in series with the primary windings of isolation pulse transformers 42 and 43. A lead 57 connects the circuit of FIG. 2 with a suitable source of DC power which is typically maintained at 20 volts.

The trigger circuit of FIG. 2 is interconnected to the gates of the SCR's shown in FIG. 1 through conductor pairs 16 and 20, 17 and 21, 19 and 23, and 18 and 22, each pair being connected to individual secondary windings of pulse transformers 42 and 43. It is noted that the pulse transformers 42 and 43 each power a separate pair of SCR's; specifically transformer 42 delivers pulses to SCR's 2 and 3, while the isolation transformer 43 delivers pulses to SCR's 4 and 5.

Figure 3:
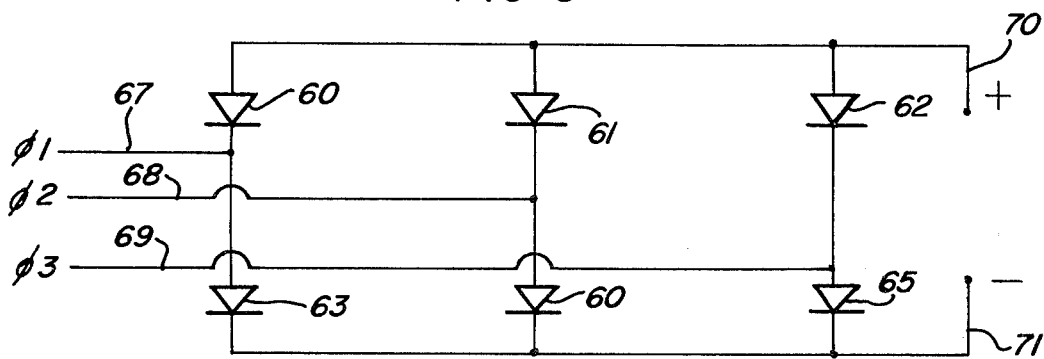
FIG. 3 is a diagram of a conventional rectifier circuit which may be used as a source of DC power in the converter circuit set forth in FIG. 1.

FIG. 3 of the drawing represents a typical threephase rectifier circuit, which may be used to supply DC power to the circuit shown in FIG. 1. A rectifier circuit which may be enclosed within the broken lines 6 and 7 of FIG. 1 is set forth in some detail in FIG. 3, and includes diodes 60, 61, 62, 63, 64 and 65. As shown in FIG. 3, the diodes are connected to a source of threephase power, which is introduced to the circuit by means of conductors 67, 68 and 69. The output of the rectifier circuit in FIG. 3 appears across leads 70 and 71, which are connected in series with the conductors 37 and 38, and 39 and 40 as shown in FIG. 1.

Figure 4:
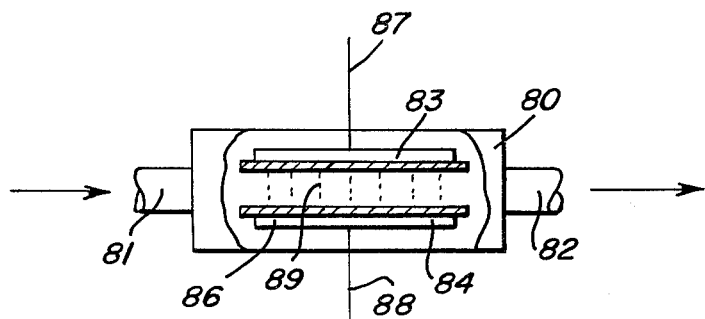
FIGS. 4, 5 and 6 are plan view diagrams with parts broken away of conventional corona generators, which may be used as the power load in the circuit of FIG. 1.

The circuit of FIG. 1 is used to supply high frequency, symmetrical AC power to a corona generator type load, which is indicated in FIG. 1 as being enclosed within broken line 30. A corona generator type load may typically comprise a corona generator or may comprise a load which comprises capacitance and resistance characteristics similar to that exhibited by a corona generator. The corona generator load represented by broken line 30 may typically comprise a corona generator device which is set forth in FIGS. 4, 5 and 6 of the drawing. In FIG. 4, 80 represents a gas tight container which is provided with gas inlet and outlet means 81 and 82 respectively. Within the container 80 are located electrode surfaces 83 and 84. The electrode surfaces are covered with a suitable dielectric layer 85 and 86 respectively. Connected to the electrodes 83 and 84 are conductors 87 and 88, which may be interconnected with leads 31 and 32 shown in FIG. 1. The space which exists between the dielectric coated electrodes 84 and 85 is discharge gap 89.

Figure 5:
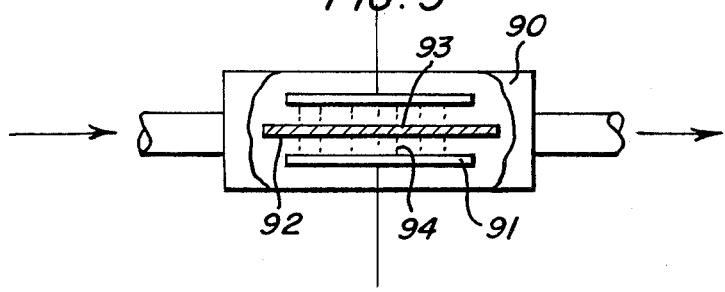
Figure 6:
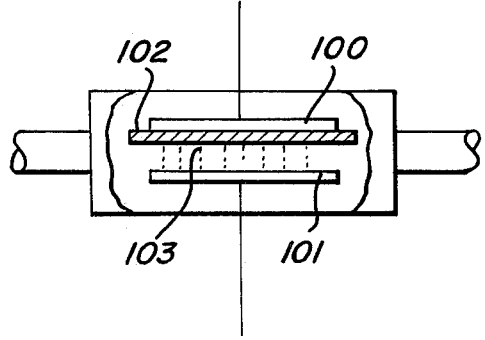

The device shown in FIG. 5 is similar to that shown in FIG. 4. However, electrodes 90 and 91 are separated by a dielectric plate 92, which defines two discharge gaps, 93 and 94. The device in FIG. 6 shows a slightly different configuration of a suitable corona discharge device, wherein electrode plates 100 and 101 are separated by means of single dielectric layer 102, which is applied to the surface of electrode 100. A discharge gap 103 is defined by the space between electrodes 100 and 101.

Figure 7:
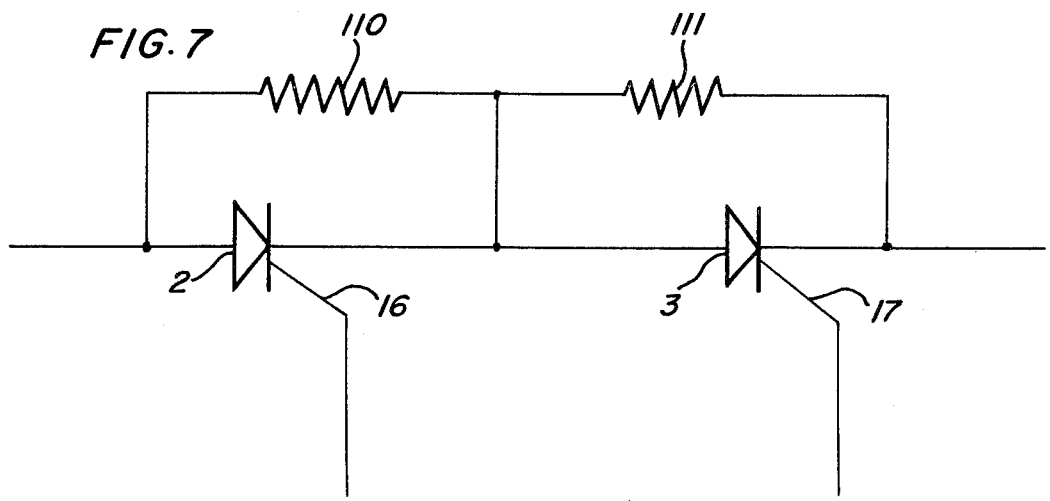
FIG. 7 is a circuit diagram of a series SCR forward voltage unequalization network which may be optionally used in the circuit of FIG. 1.
Figure 8:
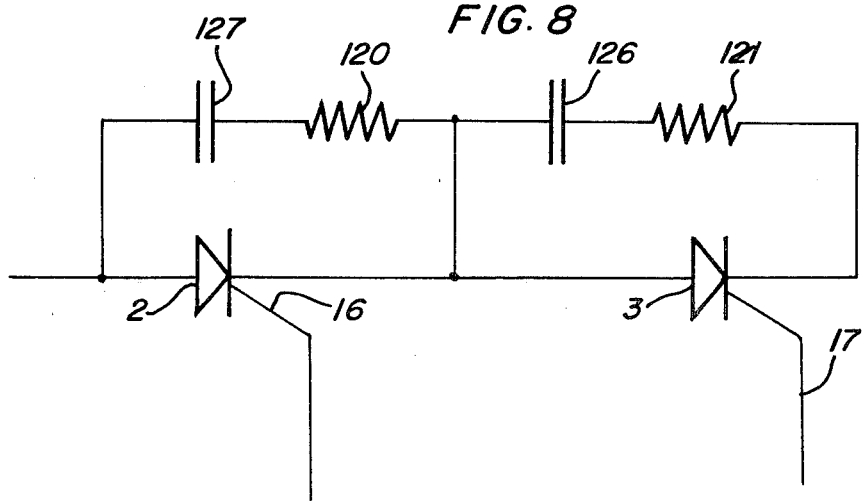
FIG. 8 is another forward voltage unequalization network diagram which includes snubber capacitors, which may be used in the circuit of FIG. 1.

The FIGS. 7 and 8 show two configurations of unequalization networks which are preferably used in conjunctions with the pairs of SCR's 2 and 3, and 4 and 5 shown in FIG. 1. In FIG. 7 it is shown that SCR's 2 and 3 and their accompanying gate leads 16 and 17 are series-parallel connected with resistances 110 and 111. The resistance values of the resistors 110 and 111 vary by about 10 to 20 percent.

In FIG. 8, a second preferred unequalization network is shown which may be used in conjunction with each pair of SCR's, 2 and 3, and 4 and 5, shown in FIG. 1. In FIG. 8 SCR's 2 and 3, which include their gate leads 16 and 17, are connected in series-parallel with resistances 120 and 121, and in addition snubber capacitors 126 and 127 are connected in series with the resistances 120 and 121. The values of the resistances and capacitances shown in FIG. 8 differ from each other by about 10 to 20 percent.

In operation, the circuit of FIG. 1 is supplied with rectified electrical power by means of the rectifier circuits 6 and 7 at a voltage on the order of about 150 to 600 volts DC. The DC power of rectifier circuit 6 appears across SCR pair 2 and 3; SCR pair 2 and 3 is connected to the trigger circuit 15 by means of leads 16 and 20, and 17 and 21. The trigger circuit 15 delivers an electrical pulse of about 20 volts, whereupon the SCR's 2 and 3 conduct. The power conducted by SCR's 2 and 3 passes through the diode 9 and appears across the primary of power transformer 25. The diode 8 prevents the pulse transmitted by SCR's 2 and 3 from reaching the loop of the circuit which includes SCR's 4 and 5. When the power pulse appears across the primary of transformer 25, a transformer pulse appears across the secondary of the power transformer 25 at a voltage which is multiplied in accordance with the winding ratios of the power transformer 25. Preferably, this winding ratio will be on the order of from about 8:1 to 30:1. The transformed power pulse then is applied to the plates of a corona generator type load, shown as 30, and which may comprise the devices shown in FIGS. 4, 5 and 6. The electrical pulse serves to ionize the gas appearing between the plates of the corona generator, whereupon the pulse is conducted. As the pulse is conducted across the gap of the corona generator, the voltage drop across the gap is clamped at a fixed value due to the conductivity of the ionized gas existing between the plates. The conduction across the plates abruptly ceases since the electrons cannot go through the dielectric. The abrupt stoppage of current causes an opposite voltage pulse to appear through the secondary winding of transformer 25, which is then transformed through the primary winding and thence to the SCR's 2 and 3. This reverse pulse serves to shut off, that is, commutate, the SCR's 2 and 3 to a non-conductive or blocking mode.

Subsequent to firing SCR's 2 and 3, the trigger circuit 15 then delivers an alternate trigger pulse to SCR pair 4 and 5. SCR's 4 and 5 then conduct a power pulse from interconnected rectifier circuit 7, through the diode 8 and then through the secondary of power transformer 25 in a direction opposite to the pulse previously transmitted by SCR's 2 and 3. This power pulse appears across the plates of corona generator 30 with a polarity opposite to that of the previously delivered pulse. Thus, it is seen that by alternately firing SCR pair 2 and 3, and then SCR pair 4 and 5, the power pulses appearing across the corona generator plates are symmetrical, and each plate is therefore alternately charged to opposite polarity. In operation of the apparatus it is of significant importance that the output of the trigger circuit 15 and power transformer 25 be maintained as symmetrical as possible to minimize electro-mechanical vibrations in the power transformer 25. When the current is tuned to produce a string of positive pulses within about 0.1 microsecond of being with the center of the negative string, the vibrations cancel and noise level is at a minimum.

The flip-flop trigger circuit which is shown in FIG. 2, as well as the rectifier circuit shown in FIG. 3, is conventional, and operate in the conventional manner. Furthermore, the corona generator devices shown in FIGS. 4, 5 and 6 represent conventional corona generator type apparatus, wherein the electrodes and dielectric plates thereof may be assembled in various configurations. Preferably, the corona generators include a thin dielectric separator which has a thickness on the order of 0.1 to 0.5 mm. The discharge gap between the dielectric surfaces is preferably on the order of 0.5 to 3.0 mm. The corona generator devices may be used to convert oxygen to ozone, or alternatively the generators may be used to induce a variety of chemical reactions which take place within a high voltage discharge corona.

The trigger circuit shown in FIG. 2 is preferably operated at a frequency of from about 100 to 10,000 Hz. The output of the SCR circuit is preferably transformed by power transformer 25 so as to produce an output voltage to the corona generator load on the order of from about 4,000 to 15,000 volts peak. While in the present drawing the electrical load in FIG. 1 comprises a corona generator, it should also be understood that the frequency converter circuit of FIG. 1 may be used to supply high frequency, high voltage power to electrical loads which comprise resistance capacitance characteristics similar to that of a corona generator device.

To further indicate the construction of the present circuits, the following table is given to indicate the values of the various circuit elements set forth therein.

TABLE

| Figure | Component & Ref. No. | Volume and/or Mfg. Description |
| --- | --- | --- |
| 1 | SCR 2, 3, 4 & 5 | GE types C392, C393, C394, C395 or C609 |
|  | Capacitor 10 & 11 | Oil Filled 10 to 100 mf |
|  | Transformer 25 | Secondary/Primary |
|  | Diode 8 & 9 | A90-11-S-F1A1 1000 v 4500 surge amps |
| 2 | Transistor 40 & 41 | 2N6027 or 2N6028 |
|  | Transformer 42 & 43 | Pulse Engineering, Inc. Type 5258 |
|  | Capacitor 45 | 0.01 mf |
|  | Resistor 46 | 10 K ohms |

TABLE-continued

| Figure | Component & Ref. No. | Volume and/or Mfg. Description |
| --- | --- | --- |
|  | Variable Resistor 47 | 50 K ohms |
|  | Resistor 48 | 10 K ohms |
|  | Resistor 50 & 51 | 100 K ohms |
|  | Variable Resistor 52 | 1 K ohm |
|  | Resistor 53 & 54 | 100 ohms |
|  | Resistor 55 & 56 | 470 ohms |
| 3 | Diode 60, 61, 62, 63, 64 & 65 | A90-11-S-F1A1 1000 v 4500 surge amps. |
| 7 | Resistor 110 & 111 | 1 to 5 ohms 50 watts |
| 8 | Resistor 120 & 121 | 1 to 5 ohms 50 watts |
|  | Capacitor 126 & 127 | 0.1 + 1.0 mf. 1000 volt |

The above description clearly describes and sets forth an improved solid-state frequency converter circuit which may be used to supply high frequency, high voltage power for a variety of purposes.

I claim:
1. A power supply for converting high voltage DC power into high voltage AC power at frequencies of up to 10,000 Hz comprising:
   a first circuit means including a first source of DC power connected in series circuit relationship with a first diode means and first SCR means, said first SCR means including at least two series connected SCR devices;
   a second circuit means including a second source of DC power connected in series circuit relationship with a second diode means and second SCR means, said second SCR means including at least two series connected SCR devices;
   a power transformer having a primary and secondary winding with said primary winding connected in common across said first and second circuit means and interconnecting said first and second circuit means in a series circuit relationship such that the conductive polarity of the first circuit means through said primary winding is opposite to the conductive polarity of said second circuit means through said primary winding, said secondary winding being connected in series with a corona discharge type load;
   trigger means connected to said first and second SCR means for alternately triggering the control gates of the SCR devices of said first SCR means and then the control gates of the SCR devices of said second SCR means at the desired high frequency;
   first unequalization means connected in parallel across said first SCR means and comprising a separate predetermined impedance means for each of said series SCR devices in said first SCR means with each separate predetermined impedance means being unequal in magnitude and varying from each other by at least about ten percent; and
   second unequalization means connected in parallel across said second SCR means and comprising other separate predetermined impedance means for each of said series SCR devices in said second SCR means with each of said other separate predetermined impedance means being unequal in magnitude and varying from each other by at least about ten percent.

2. A power supply as defined in claim 1 wherein each of said separate predetermined impedance means for said first and second unequalization means respectively consists of resistors.

3. A power supply as defined in claim 1 wherein each of said separate predetermined impedance means for said first and second unequalization means comprises a series resistance and capacitance network.

4. A power supply as defined in claim 1 wherein said load comprises a corona generator.

5. A power supply as defined in claim 1 wherein said load comprises an ozone generator.

* * * * *